United States Patent [19]

Kaleel

[11] 4,045,166

[45] Aug. 30, 1977

[54] ARABIC BREAD OVEN

[76] Inventor: Jack T. Kaleel, 3801 Loretta Drive, Salt Lake City, Utah 84106

[21] Appl. No.: 614,508

[22] Filed: Sept. 18, 1975

[51] Int. Cl.² .............................................. F27B 9/00
[52] U.S. Cl. ................... 432/146; 126/25 A; 99/360; 99/443 C
[58] Field of Search .............. 432/120, 121, 124, 128, 432/129, 141, 143, 146, 147, 150, 162, 148; 126/25 A, 41 R; 99/360, 443 C; 219/385 R; 431/186, 189

[56] References Cited

U.S. PATENT DOCUMENTS

| | | | |
|---|---|---|---|
| 838,270 | 12/1906 | Peters | 432/146 |
| 1,280,205 | 10/1918 | Garza | 432/124 |
| 1,281,489 | 10/1918 | Best | 432/162 |
| 1,458,021 | 6/1923 | Bamford | 99/443 C |
| 1,555,336 | 9/1925 | Vaughan | 99/443 C |
| 2,025,252 | 12/1935 | Stencell | 126/25 A |
| 2,121,477 | 6/1938 | Dennis et al. | 126/25 A |
| 2,841,684 | 7/1958 | Miskella | 219/385 |
| 3,372,655 | 3/1968 | Williams | 432/146 |

*Primary Examiner*—John J. Camby
*Assistant Examiner*—Henry C. Yuen
*Attorney, Agent, or Firm*—B. Deon Criddle

[57] ABSTRACT

An oven for the continuous baking of Arabic bread and the like. An endless mesh conveyor has gas burners adjustably positioned beneath the upper run thereof at the inlet of the oven and for more than one-half the length of the oven and a vertically adjustable overhead gas burner assembly is provided at the tail end of the oven. Venting of the interior of the oven is provided through openings in a side wall and exhaust stacks connected into the opening and extending upwardly from the top of the oven housing.

6 Claims, 4 Drawing Figures

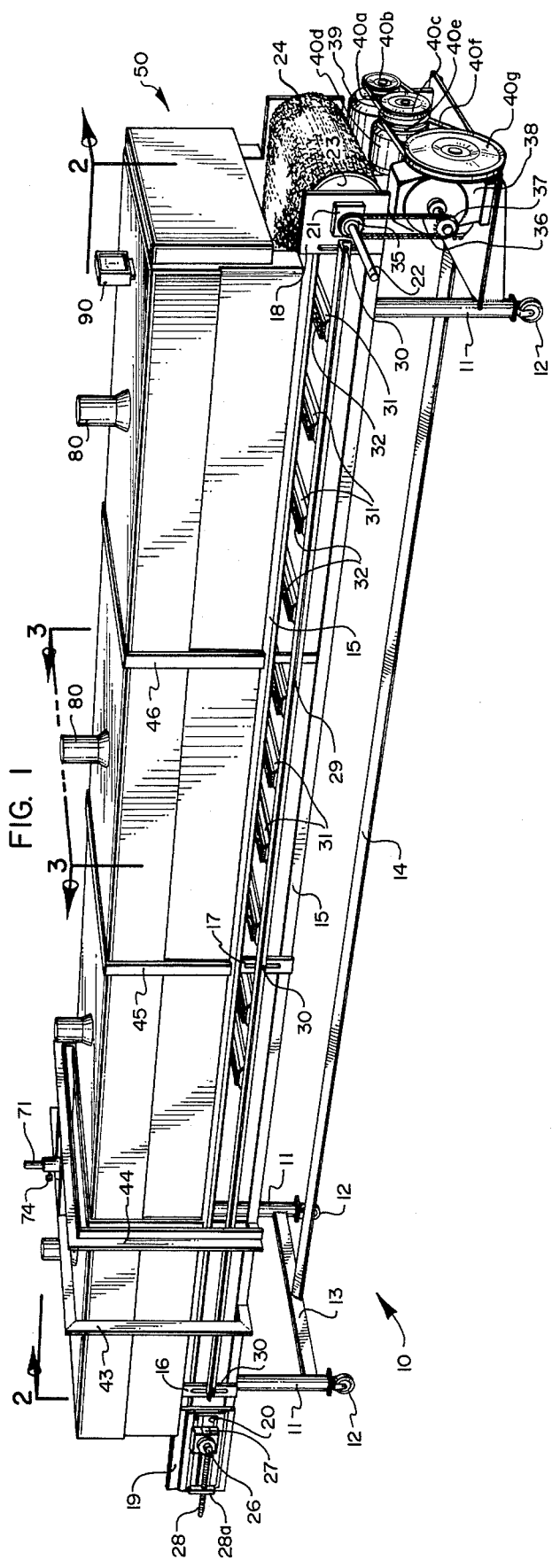

ARABIC BREAD OVEN

BRIEF DESCRIPTION OF THE INVENTION

1. Field of the Invention

This invention relates to ovens for the baking of bread and the like and is particularly concerned with an oven that is capable of continually baking flat Arabic-style bread that rises to a limited extent during the baking process and that desirably has a relatively hard outer crust and that is quite chewy in comparison with the usual American-style breads.

2. Prior Art

There have been a great many bread baking ovens developed in the past. Generally, these ovens provide for a uniform heating of the product being baked as the product is moved on a conveyor from an entrance-way to an exit. While suitable for many types of baking, and especially for the baking of American-style breads, such ovens are not suitable for use in the baking of Arabic-style bread, in that they do not provide for an initial bottom heating and a subsequent top heating of the bread and do not provide for proper venting as the bread is baked.

SUMMARY OF THE INVENTION

It is the principal object of the present invention to provide an oven suitable for the continuous baking of Arabic-style breads and the like.

Other objects are to provide such an oven that will allow the continuous feeding of Arabic-style bread dough in one end, a heat application from beneath the bread dough until the dough begins to rise slightly and bake and a subsequent application of heat from above, while removing the direct heat application from below, to properly bake the exterior crust of the Arabic-style bread.

Still another object of the invention is to provide a means for allowing regulated venting of the interior of the oven, both as a means for controlling the temperature of the oven and as a means of allowing moisture to escape.

Principal features of the invention include an endless, mesh belt, conveyor extending through an elongate oven housing and beyond the ends thereof; a lower burner assembly, comprising spaced apart gas burners mounted to be easily vertically adjusted between the runs of the conveyor and extending from an inlet to the housing to a point beyond the halfway point of the travel of the conveyor within the housing; and a upper burner unit that is mounted for easy vertical adjustment and that has burners extending from a location short of the midway point of the housing to the discharge end of the housing. The upper burner is positioned above the upper run of the conveyor belt and vent holes are provided in insulated side walls of the housing to allow for temperature control and moisture escape. The vent holes are connected, through spaces between the walls to vent at the top of the housing and the amount of heat and moisture allowed to pass through the vents is regulated by slides mounted inside the housing walls and adjustable from the discharge end of the housing.

Additional objects and features of the invention will become apparent from the following detailed description, taken together with the accompanying drawing.

THE DRAWINGS

FIG. 1 is a perspective view taken from above and at one end of the oven of the invention;

FIG. 2, a vertical, longitudinal section, taken on the line 2—2 of FIG. 1;

FIG. 3, a vertical transverse section taken on the line 3—3 of FIG. 1; and FIG. 4, an enlarged cross-sectional view similar to that of FIG. 3.

DETAILED DESCRIPTION

Figure 4:
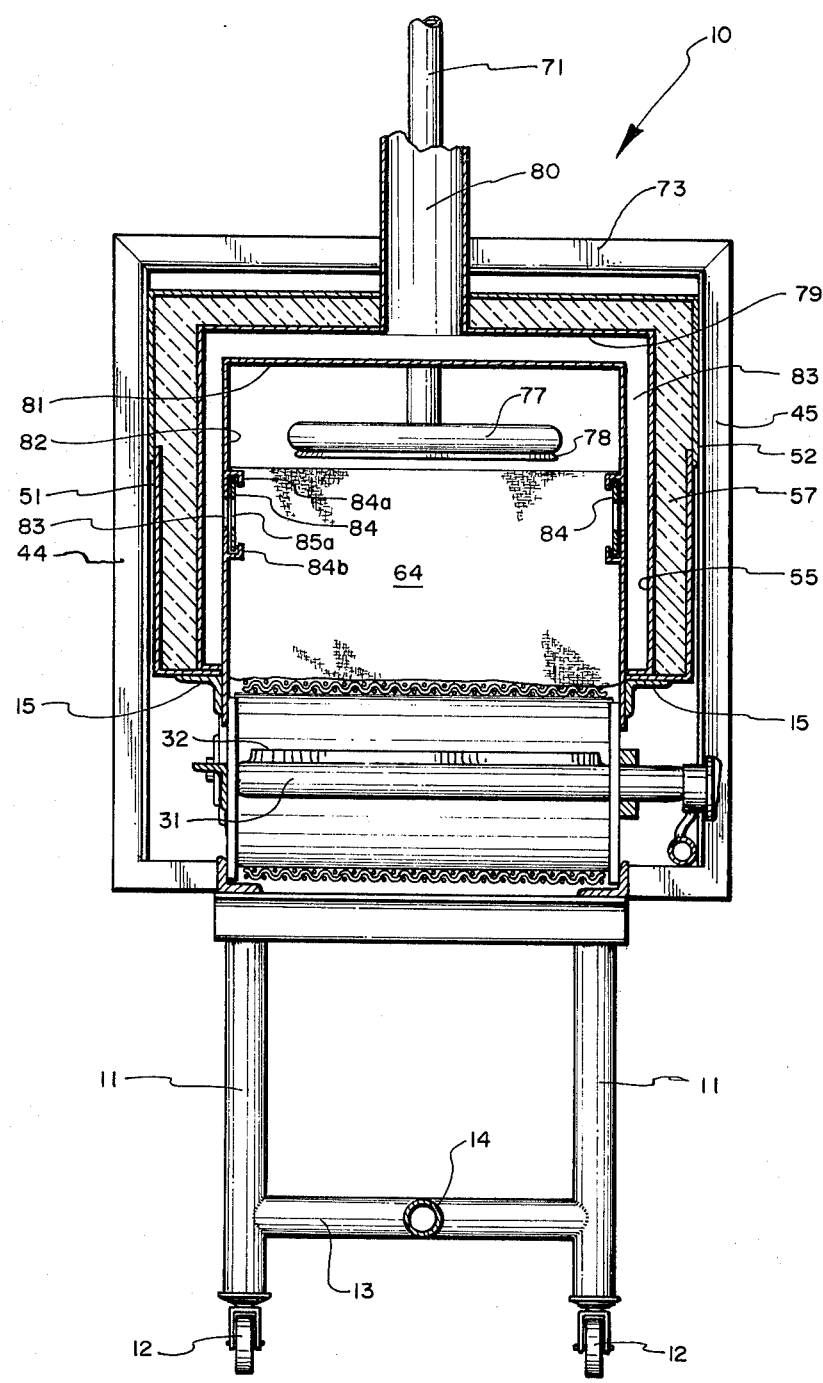

Referring now to the drawings:

In the illustrated preferred embodiment, the Arabic-style bread oven of the invention is shown generally at 10. As shown, the oven includes a supporting frame made up of interconnected legs 11 with casters 12 thereon, cross braces 13 and 14, and sets of spaced apart side rails 15. Each set of side rails 15 is held apart by three slotted spacers 16, 17 and 18, each of which has a vertical slot therein. In addition, a spacer 19, at the discharge end of the oven, has an elongate longitudinal slot 20 formed therein.

Journals 21 are formed in the spacers 18 and the shaft 22 of a head pulley 23 extends through and is rotatable in the journals. An endless, mesh belt 24 is trained around the head pulley 23 and a tail pulley 25 (FIG. 2) to provide an endless conveyor for the oven. A shaft 26 of the tail pulley 25 extends through the slots 20 of spacers 19 and through blocks 27 that are mounted to reciprocate within grooves provided therefore in the spacers 19. The blocks 27 are threaded onto rods 28, such that the turning of the rods 28 within supports 28a provided therefore on the spacers 19 will reciprocate the blocks. This, moves the pulley 25 towards or away from the pulley 23 to adjust the tension in the conveyor belt 24. Angle irons 29 extend parallel to the rails 15 and are secured to the spacers 16, 17, and 18 by bolts 30 that extend through holes provided therefore in the angle irons 29 and through the elongate slots provided in the spacers. Nuts, not shown, are threaded onto the bolts 30 to secure the angle irons 29 to the spacers. Spaced apart tubes 31 interconnect the angle irons at each side of the oven and a burner 32 is provided in the upper portion of each tube 31. Tubes 31 are interconnected by a line 33, that extends parallel to the angle irons 29, and which is connected to a gas supply line, not shown. The tubes 31 extend between the upper and lower runs of the conveyor belt 24 and are movable up and down with the angle irons, simply by releasing the bolts 30 and sliding them within the elongate slots of the spacers. This allows the burners to be moved up and down with respect to the upper run of the conveyor belt 24 and thus to be movable towards and away from the products carried by the conveyor belt. The lower burners are spaced below the housing and extend from adjacent to the head pulley to a location past the midpoint of the housing.

Each sprocket 35 on the end of shaft 22 is driven by a chain 36 that passes around a sprocket 37 of a gear box 38. The gear box, in turn, is driven by a motor 39 through drive means 40 including a belt 40a that interconnects a pulley 40b on the output shaft of the motor and a pulley 40c of a clutch 40d. Another pulley 40e of the clutch has a belt 40f therearound. Belt 40d also passes around a pulley 40g on the input shaft of the gear box. When the clutch is engaged the motor, which is continuously operating, drives the gear box 38 and the conveyor belt. When the clutch is disengaged the conveyor belt is stopped. By regulating the frequency of energization of the clutch, in conventional fashion, the rate of travel of bread on the conveyor, through the conveyor can be regulated.

Support braces 43–46 are fixed to the rail members 15 and project upwardly therefrom to support an oven housing, shown generally at 50.

The oven housing 50 is of generally rectangular configuration, with exterior side walls 51 and 52, FIG. 3, interconnected by an exterior top wall 53 and interior side walls 54 and 55 and interior top wall 56. An insulating material 57, such as asbestos fills the space between the interior and exterior walls and helps to retain heat within the housing 50. An inlet end wall, FIG. 2, made up of an outer wall 58 and an inner wall 59 with the insulating material 57 therebetween extends from the top of the housing down to a position close to, but spaced slightly above, the upper surface of the conveyor belt 24. Similarly, a discharge wall, made up of an inner wall 61, and an outer wall 62 interconnected by insulating material 63 is provided at the discharge end of the housing and extends downwardly towards the conveyor belt. A flexible, heat retaining flap 64 then projects from the downwardly extending discharge wall to be in engagement with the upper surface of the conveyor belt 24. As will become more apparent, dough formed into the general configuration of the bread loaf desired and in a rather flat condition is placed on the conveyor belt and is carried beneath the inlet wall and into the oven. As the bread is traveled above the burners 32, the heat therefrom acts on the bread to cause it to rise slightly and to bake.

Another burner assembly shown generally at 70, comprises an inlet pipe 71 that extends into the housing 50 through sleeve 72 that is fixed to and carried by support members 73 on top of the housing. A set screw 74 is threaded through sleeve 72 to engage the inlet pipe 71 and to hold it in position. When the set screw 74 is released the pipe 71 can be raised or lowered to allow positioning of the upper burner as will be hereinafter explained. At its lower end, inlet pipe 71 is connected to a central burner pipe 75, which in turn is connected through manifold pipe 76 to burner pipes 77. The pipes 75 and 77 thus extend over the conveyor belt 24 and transversely to the direction of travel of the belt. The distance between the pipes 75 and 77 and the upper surface of the conveyor belt is determined by the positioning of inlet pipe 71 within the sleeve 72.

Bread traveling on the conveyor belt 24 is moved over the lower burners 32 and then is moved beneath burners 78 in the lower surfaces of the burner pipes 75 and 77. This alternate heat application from beneath and then from above the bread contributes greatly to a properly baked loaf of Arabic-style bread.

It is further necessary to a properly baked loaf, however, that the moisture released from the bread loaves during baking be controlled and that the temperature in the oven be rather closely regulated. To allow for such moisture and temperature control, there are provided a plurality of vent stacks 80 that extend upwardly through the exterior and interior top walls 53 and 56, respectively and the insulating material 67 therebetween. The lower ends of the vent stacks open into a chamber 79 formed between the interior top wall 56 and a spaced apart top inner wall 81 that is supported by side inner walls 82 that are spaced from the interior side walls 54 and 55 and that are supported on the side rails 15. End panels 83 at each end of the oven extend from the exterior side walls to the inner walls to seal the chambers formed between the walls.

A row of spaced apart holes 84 is provided through each inner wall and guide flanges 84a and 84b are provided inside the oven and at opposite sides of each row of holes 83 to receive a slide 85. Each slide 85 has a row of spaced holes 85a therethrough, with the spacing between holes 85a being essentially the same as the spacing between holes 84.

Slides 85 are preferably made of flat sheet metal, bent at the end nearest the discharge end of the conveyor to form a handle 86, which handle can be grasped to move the slide within the guide flanges. The positions of the slides 85 determine the alignment of holes 85a with the holes 84 and the extent to which venting of the interior of the oven through holes 85a, holes 84, the chamber 79 and the vent stacks 80. The amount of venting, will, of course, regulate both the amount of moisture in the oven and the temperature. For convenience, a temperature indicating gauge 90 can be mounted on the oven and can be connected in conventional fashion to continually show the interior temperature of the oven.

With the oven of the present invention the Arabic-style bread can be readily baked. The baking temperature and humidity can be controlled to the degree necessary for satisfactory baking and there is no need for expensive and complicated temperature responsive control valve or other such equipment.

Since the inlet end wall extends close to the conveyor belt, (the spacing being just enough to allow a flat loaf of soft bread dough to pass thereunder), very little of the heat rising from the lower burners is lost at the inlet end of the oven. The flap 64, allows the slightly raised and baked loaves of bread to pass out of the oven while retaining most of the heat within the housing. While the oven housing does not include any bottom panels, these are not necessary since the rising heat is adequately trapped by the housing.

Although a preferred form of my invention has been herein disclosed, it is to be understood that the present disclosure is by way of example, and that variations are possible without departing from the subject matter coming within the scope of the following claims, which subject matter I regard as my invention.

I claim:

1. An oven for baking Arabic-style bread and the like, comprising an endless mesh conveyor belt having an upper run and a lower run;

drive means for driving the conveyor belt;

support means for the conveyor belt and the drive means;

a housing having side walls extending upwardly from the edges of the upper run of the conveyor belt, a top wall interconnecting the side walls above the conveyor belt, an inlet end wall interconnecting the side and top walls and extending from the top wall towards the upper run of the conveyor belt to a location such that Arabic-style dough formed into a flat configuration and placed on the upper run of the belt can pass thereunder, a discharge end wall at the other end of the housing interconnecting the top and side walls and extending towards the belt to a distance such that a baked loaf of Arabic-style bread on the conveyor can pass thereunder, out of the housing, and a flexible flap fixed to and extending downwardly from the discharge end wall, between the side walls and terminating at about the upper surface of the upper run of the conveyor belt;

spaced lower burners extending transversely to the direction of travel of the conveyor belt between the upper run and the lower return run of the belt, said burners being arranged from the inlet to the housing to a location beyond half the length of the housing;

means mounting said lower burners to be movable towards and away from said upper run;

upper burners in the housing above the upper run of the conveyor belt, said burners extending transversely to the upper run of the belt and being spaced in the housing from the discharge end of the housing less than one-half the length of the housing;

means mounting the upper burners to be adjustable towards and away from the upper run of the conveyor belt;

means for venting the interior of the housing, said means comprising interconnected chambers formed in the side and top walls of the housing;

vent stacks connected into the chambers in the top wall;

openings in the side wall interconnecting the interior of the oven with the chambers in the walls; and means for adjustably covering the said openings.

2. An oven as in claim 1, wherein the means for adjustable covering the said openings comprises guide flanges on each wall above and below the openings therethrough; and slide means slidable in said guide flanges, said slide means having spaced holes therethrough corresponding with the said openings and handle means for gripping said slide means to move the holes into and out of alignment with the openings.

3. An oven as in claim 1, wherein the upper burners are fixed to an inlet pipe extending upwardly through the housing; and further including means carried by the housing to adjustably fix the position of said inlet pipe.

4. An oven as in claim 1, wherein the side and top walls are insulated outside of said chambers.

5. An oven as in claim 1, further including means for regulating the speed of travel of the conveyor belt.

6. An oven as in claim 5, wherein the drive means for driving the conveyor belt includes a motor; and the means for regulating the speed of travel of the conveyor belt comprises a clutch connected between the motor and the belt, whereby the frequency of engagement determines the rate of travel of the belt.

* * * * *